(12) United States Patent
Palliser et al.

(10) Patent No.: US 6,669,133 B2
(45) Date of Patent: Dec. 30, 2003

(54) SEAT BELT RETRACTOR WITH MULTI-LEVEL LOAD LIMITING

(75) Inventors: Martyn Neil Palliser, Carlisle (GB); John Bell, Carlisle (GB); Andrew Park, Sterling Heights, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/241,489

(22) Filed: Sep. 12, 2002

(65) Prior Publication Data

US 2003/0192976 A1 Oct. 16, 2003

(30) Foreign Application Priority Data

Apr. 16, 2002  (GB) .............................................. 0208702

(51) Int. Cl.[7] .............................................. B60R 22/28
(52) U.S. Cl. ................................................... 242/379.1
(58) Field of Search ....................... 242/379.1; 280/805, 280/806; 297/470, 471, 472

(56) References Cited

U.S. PATENT DOCUMENTS

| 4,323,205 A | * | 4/1982 | Tsuge et al. ............. 242/379.1 |
| 5,014,927 A | | 5/1991 | Ogawa et al. |
| 5,788,177 A | | 8/1998 | Keller et al. ............. 242/379.1 |
| 5,924,641 A | | 7/1999 | Keller et al. ............. 242/379.1 |
| 6,216,972 B1 | * | 4/2001 | Rohrle .................... 242/379.1 |
| 6,416,006 B1 | * | 7/2002 | Huber ..................... 242/379.1 |

FOREIGN PATENT DOCUMENTS

| EP | 1149743 A2 | 10/2001 |
| EP | 1180457 A2 | 2/2002 |
| EP | 1213195 A2 | 6/2002 |
| GB | 11288176 | 9/1972 |

* cited by examiner

Primary Examiner—John M. Jillions
(74) Attorney, Agent, or Firm—Lonnie R. Drayer (57) ABSTRACT

A seat belt retractor has a spool mounted for rotation in the retractor for retraction or pay-out of seat belt webbing depending upon the rotation direction of the spool. A locking ring is attached to one end of the spool. A lock bar locks the locking ring against rotation when a crash is sensed. A load limiter allows further pay-out of the seat belt webbing after the spool has locked under the influence of a vehicle occupant's forward momentum. The load limiter is a torsion bar attached at one end to the locking ring and at the other end to the spool; and a wire releasably coupled in the force path between the spool and the locking ring. The resilient mechanism, i.e. the wire, decouples itself after a predetermined number of turns of the torsion bar. The thickness, length and composition of the wire, together with the number of wires may be chosen to suit a vehicle's crash criteria.

16 Claims, 8 Drawing Sheets

SEAT BELT RETRACTOR WITH MULTI-LEVEL LOAD LIMITING

FIELD OF THE INVENTION

The present invention relates to a seat belt retractor having multi-level load limiting.

BACKGROUND OF THE INVENTION

A seat belt retractor generally comprises a cylindrical bobbin or spool with a circular cross-section. Seat belt webbing is attached to and wound around the spool and the spool is mounted on a spool shaft to be rotatable in the retractor to wind in webbing under action of a retractor spring and to pay-out webbing under the influence of relatively gentle forward directed movement of a vehicle occupant, for example to allow for normal movement associated with vehicle occupancy such as reaching forwards to activate in-car controls (for a radio or a window) or to reach a glove compartment or door pocket. In the event of a crash situation, the more extreme momentum of the vehicle occupant activates a crash sensor which locks the spool against rotation and thus prevents forward motion of the vehicle occupant and injury due to impacting the interior structure of the vehicle such as the steering wheel, dashboard or windscreen.

However, this sudden locking of the seat belt spool in a crash can sometimes cause injury to the vehicle occupant due to sudden impact of the torso with the belt webbing. This is particularly true in severe crashes. In recent years this problem has been recognized and some solutions have been proposed.

DISCUSSION OF THE PRIOR ART

One known proposal has been described in U.S. Pat. No. 5,014,927, wherein load limiting is effected by interposing a plastically or elastically deformable member in the force path, for example between the spool and the innermost winding of the belt webbing. Particularly common currently is the use of a torsion bar, made of steel that twists when high torque is applied and can rotate up to seven or eight times before breaking. The pay-out of webbing is generally in proportion to the momentum of the vehicle occupant at the moment a crash is sensed. This pay-out of webbing lessens the otherwise severe restraining forces on the vehicle occupant at high vehicle speeds, especially during the initial moments of the crash.

However in known seat belt systems using torsion bars the force absorbed is constant, i.e. the force at low speeds, with small, light vehicle occupants, is the same as at high speeds with large vehicle occupants, and the force constant over the whole period of load limiting. It would be preferable to tailor the load limiting to absorb a larger load at the beginning of the crash when forces are higher and to reduce the load limiting level as the vehicle occupant contacts an airbag. This reduction in load limiting level would reduce chest injuries to the vehicle occupant and reduce chest deflection that is measured during crash simulations.

SUMMARY OF THE INVENTION

There is provided in accordance with one aspect of the present invention a seat belt retractor comprising: a spool rotatably mounted in a frame for retraction or pay-out of seat belt webbing depending upon the rotation direction of the spool; a locking ring attached to one end of the spool; a means for locking the locking ring against rotation when a crash is sensed; and load limiting means for allowing further pay-out of the seat belt webbing after the spool has locked, under the influence of a vehicle occupant's forward momentum, wherein the load limiting means comprises a torsion bar attached at one end to the locking ring and at the other end to the spool; and a resilient mechanism releasably coupled in the force path between the spool and the locking ring; and means for de-coupling the resilient mechanism after a predetermined number of turns of the torsion bar.

There is provided in accordance with another aspect of the invention a seat belt retractor comprising: a spool rotatably mounted in a frame; a locking ring attached to one end of the spool; a lockbar for locking the locking ring against rotation when a crash is sensed; and a multi-level load limiter for allowing further pay-out of seat belt webbing after the spool has locked, under the influence of a vehicle occupant's forward momentum, wherein the multi-level load limiter comprises a torsion bar attached at one end to the locking ring and at the other end to the spool; and a wire releasably coupled in the force path between the spool and the locking ring such that during a first stage of load limiting both the wire and the torsion bar provide load limiting and during a second stage of load limiting the torsion bar alone provides load limiting.

DETAILED DESCRIPTION OF THE INVENTION

The arrangement of the invention is used in a traditional seat belt retractor that is well known to a person skilled in the art. Such a seat belt retractor is shown in general in FIG. 1 and comprises a cylindrical retractor spool 1 mounted for rotation in a frame 8 to wind in and pay-out seat belt webbing (not shown).

Figure 1:
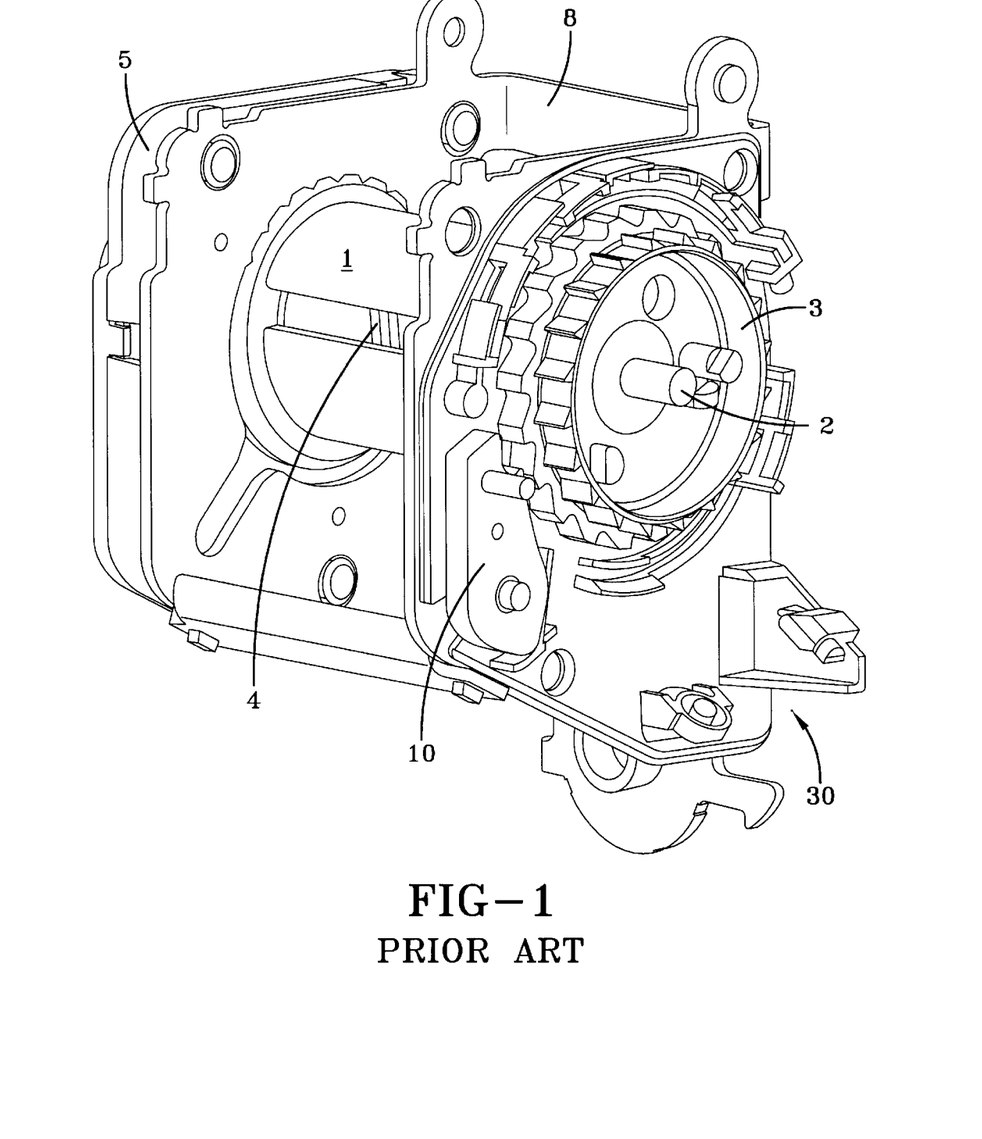
FIG. 1 is an isometric view of a known seat belt retractor that can be adapted according to one embodiment of the present invention.

In a crash, a sensor, positioned generally at 30, but not specifically illustrated, activates a locking mechanism to move a lockbar 10 to engage teeth on a locking ring 3 which is fixed to one end of the spool 1. Subject to further movement due to load limiting arrangements the spool 1 is then locked against further rotation. The other end of the spool 1 is connected to a rewind spring mechanism 5 which comprises a clock type coiled spring that biases the spool 1 to a webbing rewound condition.

Figure 2:
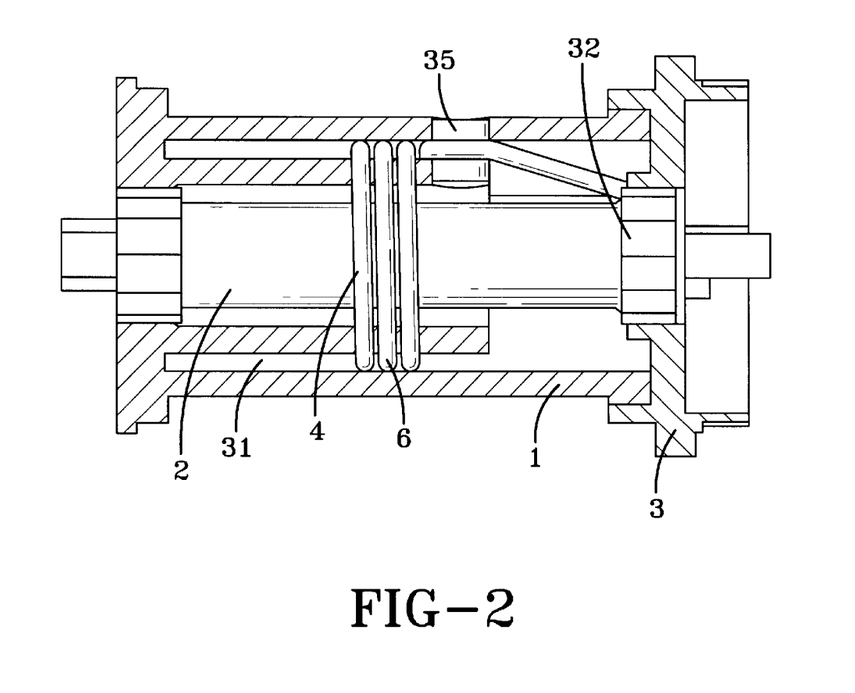
FIG. 2 is a cross-sectional view of a spool, before load limiting, according to the present invention that could be adapted to the seat belt retractor of FIG. 1.
Figure 3:
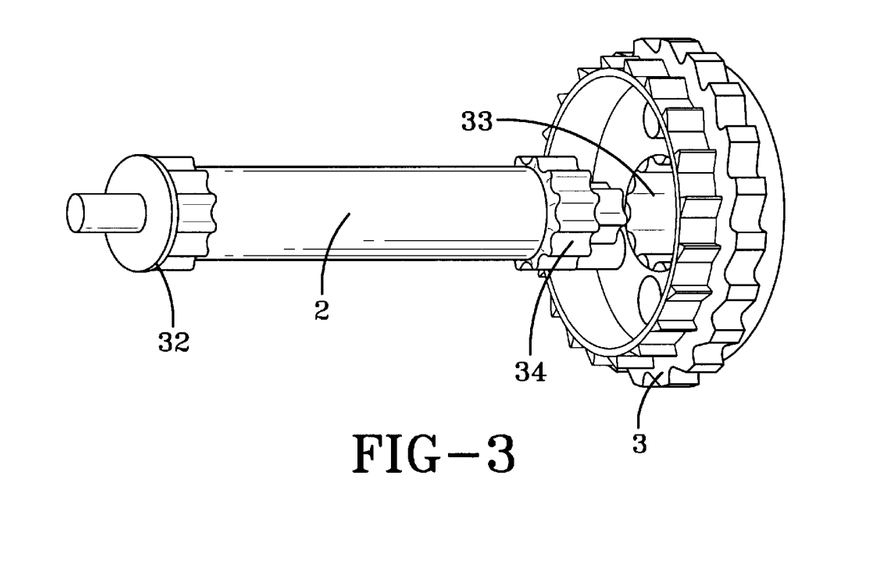
FIG. 3 is an exploded view of part of the seat belt retractor of FIGS. 1 and 2.

FIG. 2 shows the spool 1 according to the present invention and adaptable to the prior art seat belt retractor of FIG. 1 in cross section and shows a load limiting torsion bar 2 mounted along the spool axis and fixed at one end to the locking ring 3 by engagement of splines 32 in a correspondingly shaped hole 33 (shown more clearly in FIG. 3) in the locking ring 3. A wire 4 is wound around the spool 1 in a recess 31 to form coils 6, and is fixed to the torsion bar 2 at its end connected to the locking ring 3. The wire 4 is not attached to the spool. As shown in FIG. 3 the other end 34 of the torsion bar 2 is connected to the spool 1 at the side of the retractor at which the rewind spring 5 is attached to the spool 1.

During a crash, the locking ring 3 is fixed against rotation. Load limiting comes into effect when the load exceeds a predetermined load limiting load value determined by the torsional resistance of the torsion bar, causing the spool body to rotate to twist the torsion bar.

Figure 4:
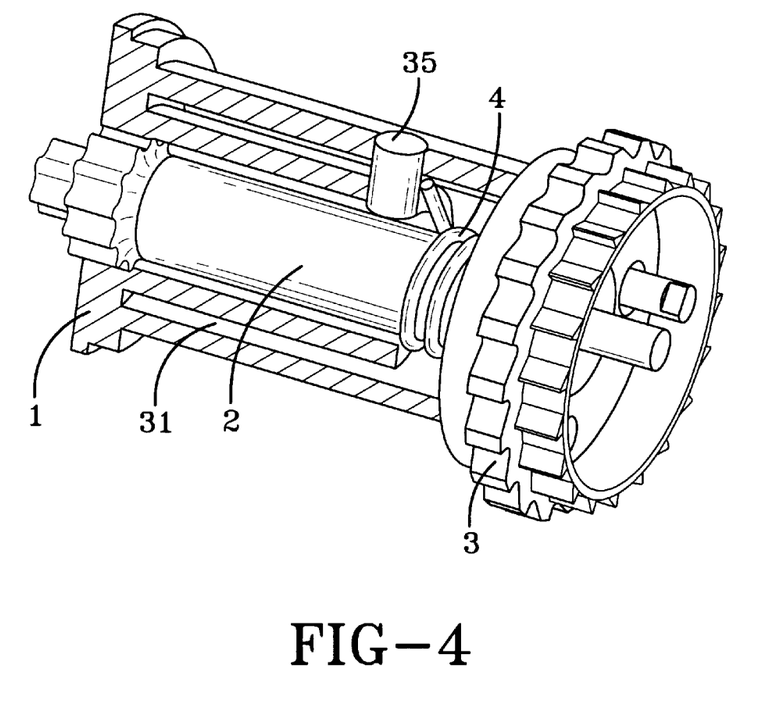
FIG. 4 is an isometric view of the spool of FIG. 2 after load limiting.

If the crash force is above a predetermined value then the force on the torsion bar 2 will cause it to twist and the spool 1 will rotate under conditions controlled by the properties of the torsion bar 2. Usually the spool 1 rotates another three to four turns causing the torsion bar 2 to twist until the crash forces have dissipated. The torsion bar 2 can typically twist up to six to eight turns before it breaks. As shown in FIG. 4 the wire 4 passes around a pin 35 in the spool body that provides a guide. The wire 4 forms a secondary load limiting mechanism.

Put another way, a secondary load limiting mechanism may comprise a wire 4, for example a wire connected to the torsion bar 2 at its fixed end, that is the end connected to the locking ring 3 or it may be connected directly to the locking ring. The wire is releasably connected to the spool for example it may be housed in a recess in the spool body, possibly but not necessarily coiled, from which it will be deployed or uncoil during load limiting and will be drawn onto either the torsion bar or the locking ring or the spool, for example by being wound onto them. Alternatively the wire could be stored in the locking ring and anchored to the spool. During load limiting various components move relative to each and so the wire may be transferred from one to the other or from the other to one.

The wire 4 adds extra resilience to the torsion bar 2 to absorb the energy of the crash. The extra resilience is dependent upon the energy required to change the direction of the wire from the spool on to the torsion bar or locking ring and also informing the wire around the torsion bar/locking ring, and this can be tailored to suit a vehicle's crash criteria by customizing the thickness, length and composition of the wire or the number of wires.

The work done by the wire is the energy taken to form the wire around the torsion bar and in changing its direction from how it is stored.

When all the wire has been transferred from the spool onto the torsion bar or locking ring after a predetermined number of turns of the torsion bar, the load level reduces because the wire is no longer being changed as when it is formed onto the torsion bar or the locking ring.

The combination of the torsion bar 2 and the secondary load limiting mechanism 4 as a multi-level load limiter raises the initial load limiting threshold giving a higher combined level of load limiting than the torsion bar 2 alone. However as the torsion bar twists the wire unwinds from the coils 6 in the recess 31 and is gradually drawn out of the body of the spool 1 past the guide pin 35 and winds onto the torsion bar 2 until the end of the wire 4 disengages fully from the spool 1, as shown in FIG. 4, leaving the torsion bar 2 alone to effect load limiting. Hence this provides for a two stage load limiter. Preferably the second, lower level, stage is arranged to coincide with the vehicle occupant contacting an inflated airbag.

Figure 5:
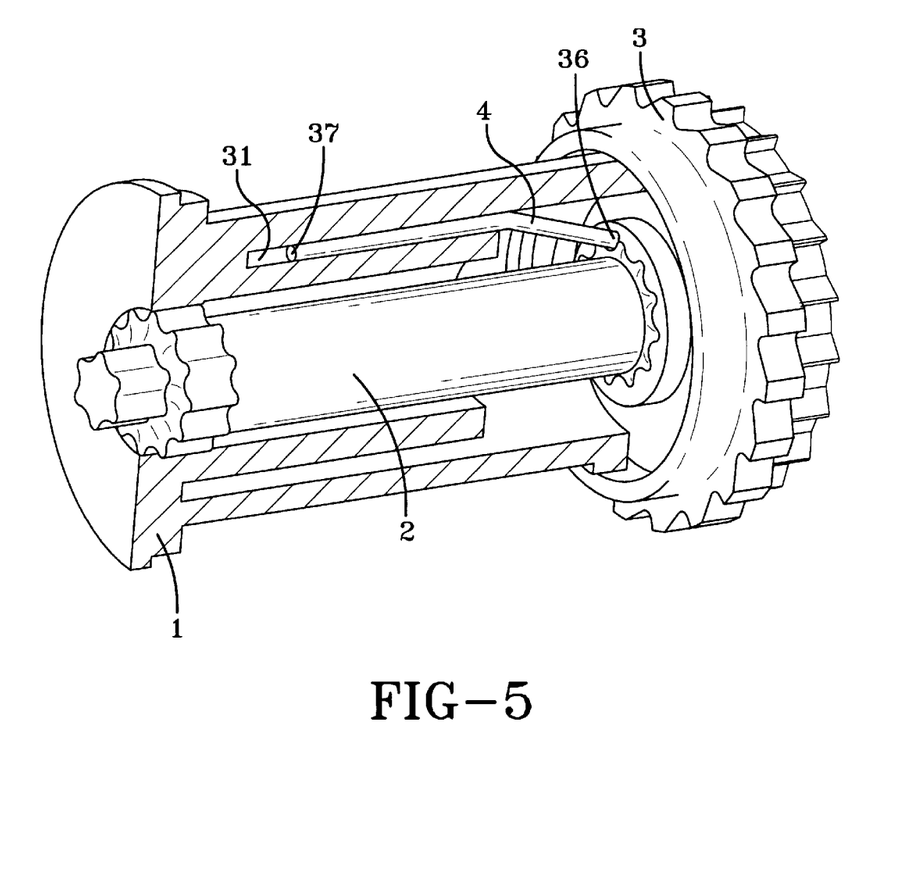
FIG. 5 is an isometric, part cut-away, view of a spool for a seat belt retractor according to a second embodiment of the invention before load limiting.
Figure 6:
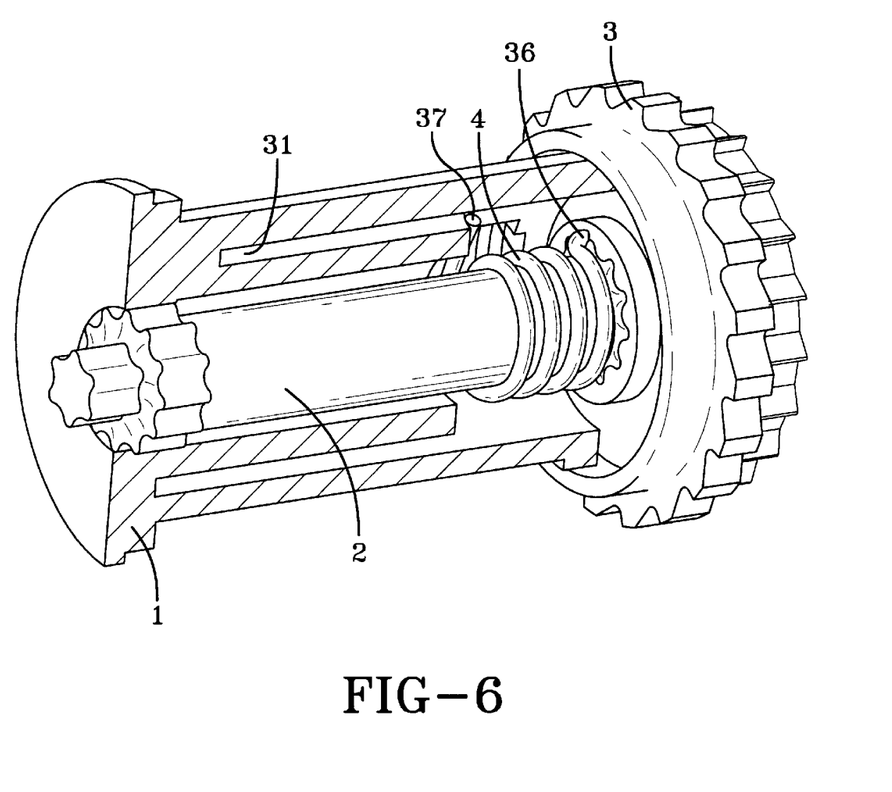
FIG. 6 is an isometric, part cut-away of a spool for a seat belt retractor according to the second embodiment of the invention after load limiting.

FIG. 5 shows a part cut-away cross section of the spool for a seat belt retractor according to a second embodiment of the invention. In this embodiment the wire 4 is connected to the torsion bar 2 at one end 36, and the other end 37 is inserted longitudinally into a recess 31 in the spool. As the torsion bar twists during load limiting, the wire 4 is drawn out of the recess 31 and is wound fully onto the torsion bar 2, as shown in FIG. 6, until it is totally coiled onto the torsion bar with the end 37 having been drawn fully out of the recess 31. The load limiting effect in this embodiment is caused by the energy needed to coil the wire onto the torsion bar.

Figure 7:
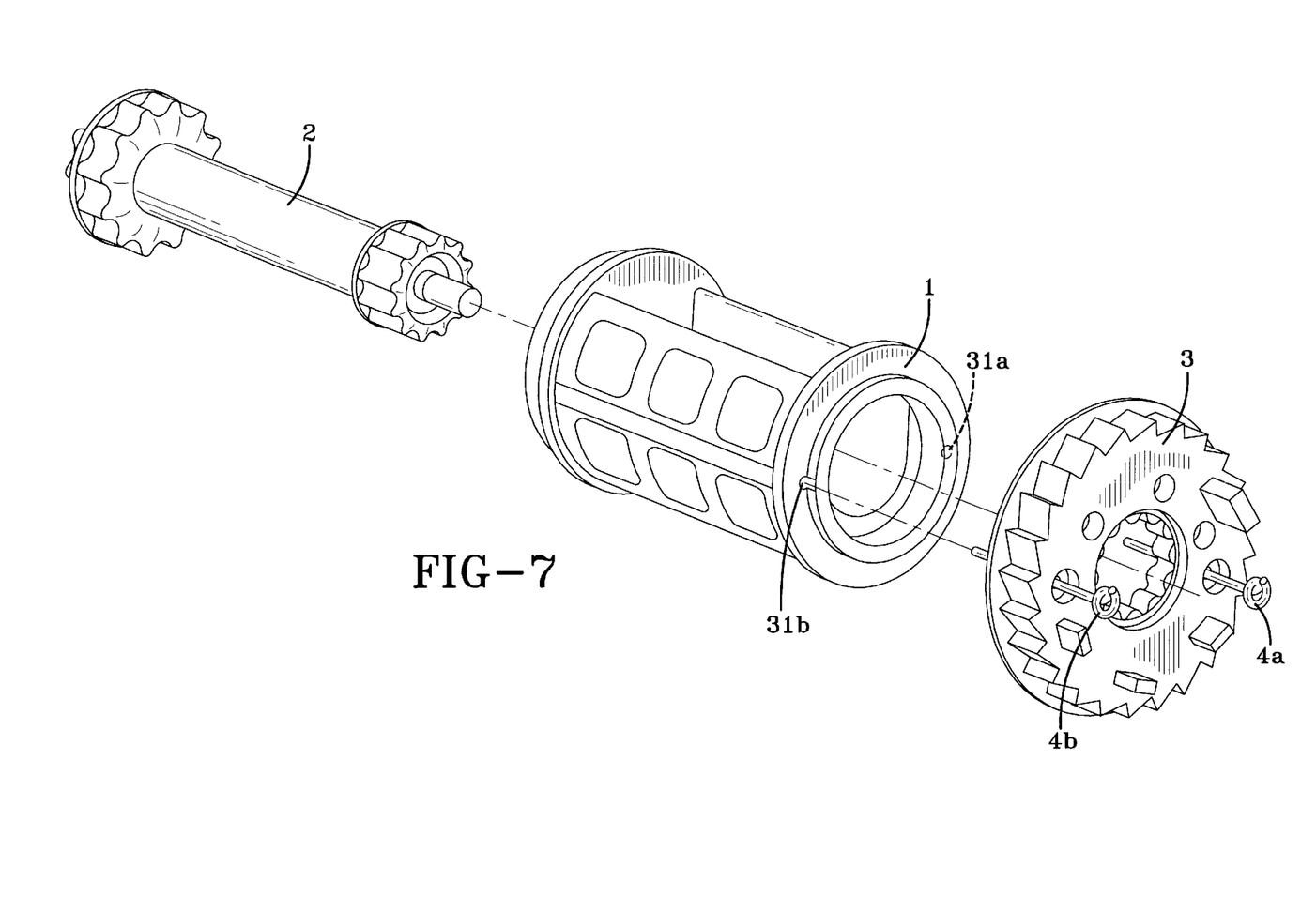
FIG. 7 is an exploded view of a spool for a seat belt retractor according to a third embodiment of the invention before load limiting.
Figure 8:
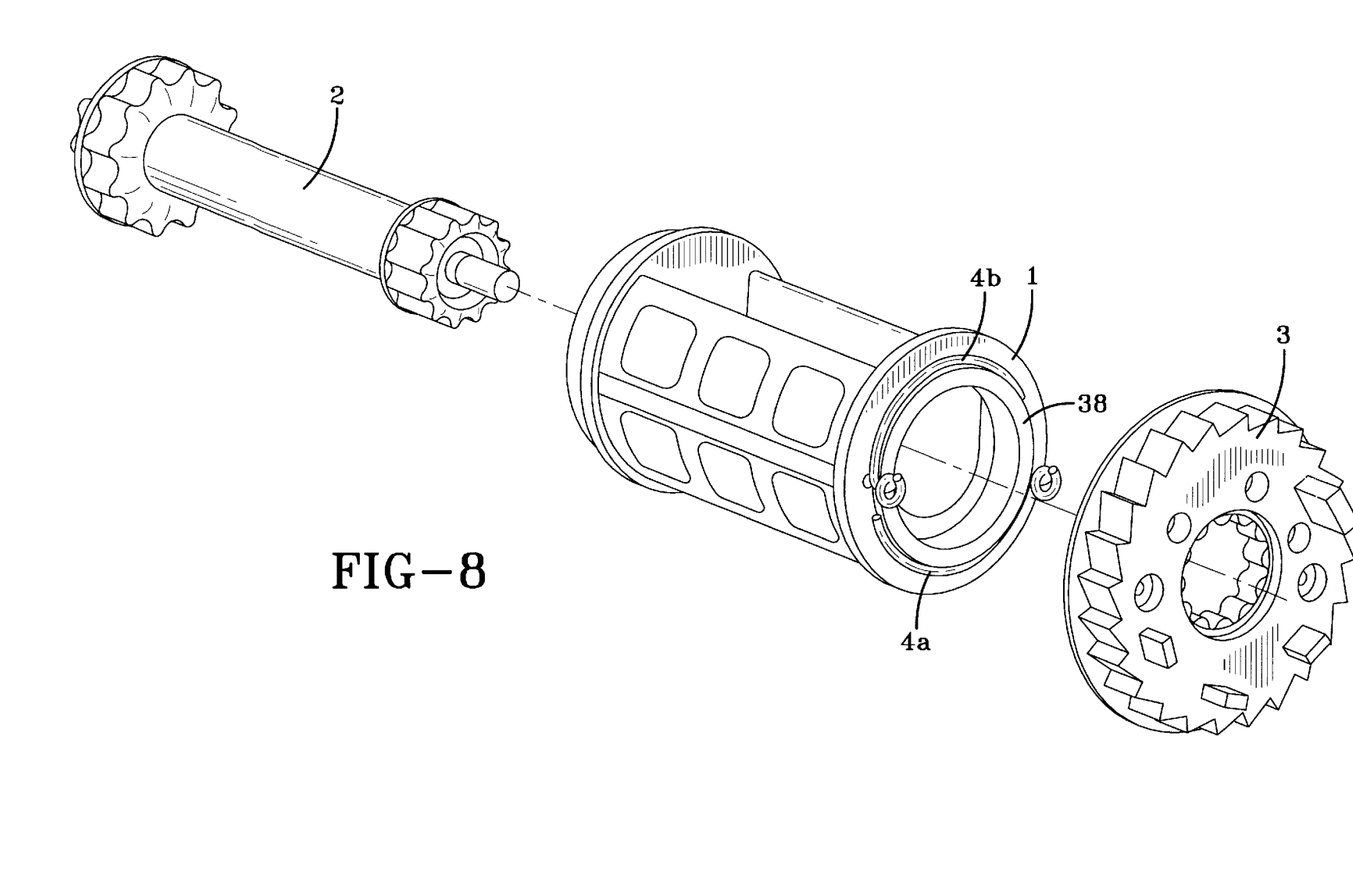
FIG. 8 is an exploded view of a spool for a seat belt retractor according to the third embodiment of the invention after load limiting.

FIGS. 7 and 8 illustrate a third embodiment of the invention in which two wires 4a, 4b are located in recesses 31a, 31b respectively in the body of the spool 1. During load limiting the wires 4a, 4b are drawn out of the recesses 31a, 31b and wound around a raised part 38 at the end face of the spool 1, as shown in FIG. 8. The load limiting effect in this embodiment is caused by the energy needed to coil the two wires onto the body of the spool.

Figure 9:
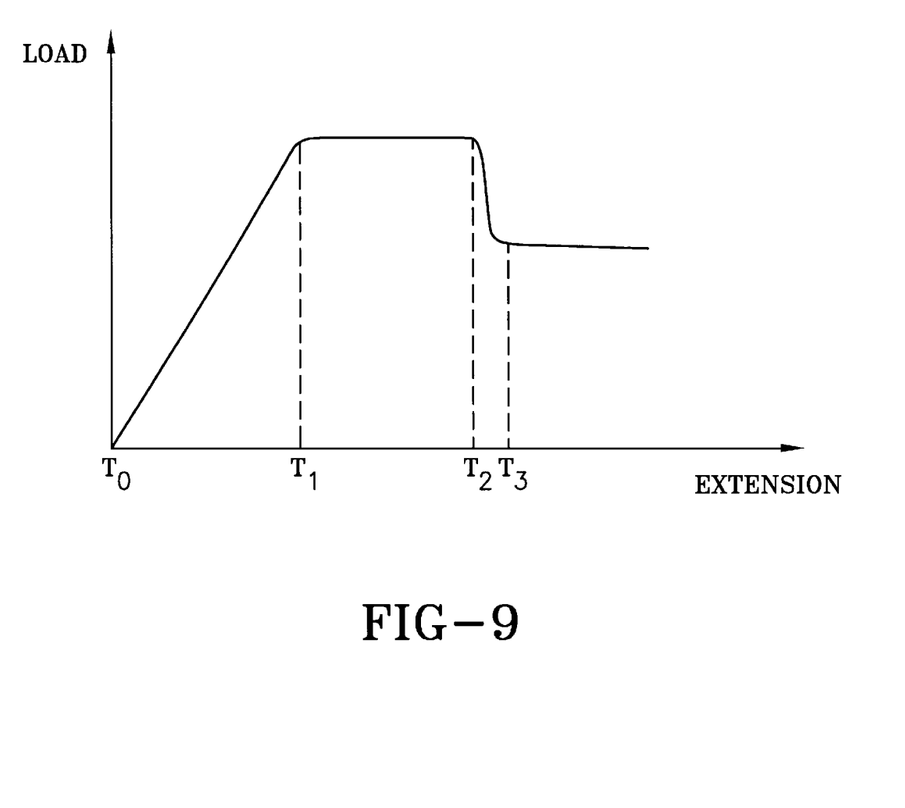
FIG. 9 is a graph showing the effects of the two stage load limiting produced by all of the embodiments.

FIG. 9 is a graph showing the effects of the two stage load limiting produced by the first embodiment. At $T_0$ a crash pulse begins and crash forces increase steadily until $T_1$ when the load limiting torsion bar 2 together with the secondary mechanism 6 come into effect, absorbing some of the load and thus leveling the forces felt by the vehicle occupant to a plateau. At $T_2$ the secondary mechanism 6 disengages and the torsion bar 2 alone is providing load limiting $T_3$. At $T_3$ the torsion bar has been twisted a maximum number of revolutions so that its' capacity to provide further load limiting has been met. One result of this sequence of events is that the vehicle occupant encounters the airbag with reduced force on his torso.

Alternatively the torsion bar 2 could be replaced by a plain bar that would not perform any load limiting function. Then the wire is the only load limiting element. The wire diameter, composition and hardness and also the diameter of the bar around which it winds, will affect the load limiting properties of the arrangement of the invention.

While specific preferred embodiments and materials have been illustrated, described and identified, it is to be understood that the invention is in no way limited thereto since modifications may be made and other embodiments of the invention will occur to those of skill in the art to which this invention pertains. Thus, it is intended to cover any such modifications and other embodiments as incorporated the features of this invention within the full lawful scope of the allowed claims as follows.

What is claimed is:

1. A seat belt retractor comprising: a spool rotatably mounted in a frame for retraction or pay-out of seat belt webbing depending upon the direction of rotation of the spool; a locking ring attached to one end of the spool; a means for locking the locking ring against rotation when a crash is sensed; and load limiting means for allowing further pay-out of the seat belt webbing after the spool has locked, under the influence of a vehicle occupant's forward momentum, wherein the load limiting means comprises a torsion bar attached at one end to the locking ring and at the other end to the spool; and a resilient mechanism comprising a wire releasably connected between the spool and the locking ring in the force path between the spool and the locking ring; and means for de-coupling the resilient mechanism after a predetermined number of turns of the torsion bar, the wire being drawn onto the torsion bar during load limiting.

2. The seat belt retractor according to claim 1 wherein the thickness, length and composition of the wire is chosen to suit a vehicle's crash criteria.

3. The seat belt retractor according to claim 1 comprising plurality of wires.

4. A seat belt retractor comprising: a spool rotatably mounted in a frame for retraction or pay-out of seat belt webbing depending upon the direction of rotation of the spool; a locking ring attached to one end of the spool; a means for locking the locking ring against rotation when a crash is sensed; and load limiting means for allowing further pay-out of the seat belt webbing after the spool has locked, under the influence of a vehicle occupant's forward momentum, wherein the load limiting means comprises a torsion bar attached at one end to the locking ring and at the other end to the spool; and a resilient mechanism comprising a wire releasably connected to the spool and the locking ring in the force path between the spool and the locking ring; and means for de-coupling the resilient mechanism after a predetermined number of turns of the torsion bar, wherein the wire is drawn onto the torsion bar during load limiting.

5. The seat belt retractor according to claim 4 wherein the thickness, length and composition of the wire is chosen to suit a vehicle's crash criteria.

6. The seat belt retractor according to claim 4 comprising plurality of wires.

7. A seat belt retractor comprising: a spool rotatably mounted in a frame for retraction or pay-out of seat belt webbing depending upon the direction of rotation of the spool; a locking ring attached to one end of the spool; a means for locking the locking ring against rotation when a crash is sensed; and load limiting means for allowing further pay-out of the seat belt webbing after the spool has locked, under the influence of a vehicle occupant's forward momentum, wherein the load limiting means comprises a torsion bar attached at one end to the locking ring and at the other end to the spool; and a resilient mechanism comprising a wire releasably connected between the spool and the locking ring in the force path between the spool and the locking ring, the wire being housed in a recess in a body of the spool from which the wire will deploy during load limiting; and means for de-coupling the resilient mechanism after a predetermined number of turns of the torsion bar, wherein the wire is drawn onto the torsion bar during load limiting.

8. The seat belt retractor according to claim 7 wherein the thickness, length and composition of the wire is chosen to suit a vehicle's crash criteria.

9. The seat belt retractor according to claim 7 comprising plurality of wires.

10. A seat belt retractor comprising: a spool rotatably mounted in a frame for retraction or pay-out of seat belt webbing depending upon the direction of rotation of the spool; a locking ring attached to one end of the spool; a means for locking the locking ring against rotation when a crash is sensed; and load limiting means for allowing further pay-out of the seat belt webbing after the spool has locked, under the influence of a vehicle occupant's forward momentum, wherein the load limiting means comprises a torsion bar attached at one end to the locking ring and at the other end to the spool; and a resilient mechanism comprising a wire releasably connected between the spool and the locking ring in the force path between the spool and the locking ring, the wire being releasably connected to the spool and housed in a recess in a body of the spool from which the wire will deploy during load limiting; and means for de-coupling the resilient mechanism after a predetermined number of turns of the torsion bar, wherein the wire is drawn onto the torsion bar during load limiting.

11. The seat belt retractor according to claim 10 wherein the thickness, length and composition of the wire is chosen to suit a vehicle's crash criteria.

12. The seat belt retractor according to claim 10 comprising plurality of wires.

13. A seat belt retractor comprising: a spool rotatably mounted in a frame; a locking ring attached to one end of the spool; a lockbar for locking the locking ring against rotation when a crash is sensed; and a multi-level load limiter for allowing further pay-out of seat belt webbing after the spool has locked, under the influence of a vehicle occupant's forward momentum, wherein the multi-level load limiter comprises a torsion bar attached at one end to the locking ring and at the other end to the spool; and a wire releasably coupled in the force path between the spool and the locking ring such that during a first stage of load limiting both the wire and the torsion bar provide load limiting and during a second stage of load limiting the torsion bar alone provides load limiting, wherein the wire is drawn onto the torsion bar during load limiting.

14. The seat belt retractor according to claim 13 wherein the wire is releasably connected to the spool.

15. The seat belt retractor according to claim 13 wherein the wire is housed in a recess in a body of the spool from which the wire will deploy during load limiting.

16. The seat belt retractor according to claim 13 wherein the wire is drawn onto the locking ring during load limiting.

* * * * *